United States Patent
Howe

[15] 3,648,111
[45] Mar. 7, 1972

[54] DEVICE FOR SENSING OVERCURRENT AND GROUND LEAKAGE CURRENT

[72] Inventor: Guy E. Howe, 200 North Main, Tonkawa, Okla. 74653

[22] Filed: Dec. 17, 1970

[21] Appl. No.: 99,037

[52] U.S. Cl............................317/18 A, 317/33 R, 317/27 R
[51] Int. Cl.........................................H02h 3/14, H02h 3/08
[58] Field of Search..............317/27, 18 D, 18 A, 18 C, 18 R, 317/33; 340/255; 307/131

[56] References Cited

UNITED STATES PATENTS

| 3,171,062 | 2/1965 | Rowe | 317/18 A |
| 2,842,718 | 7/1958 | Smith | 317/18 R |
| 3,386,004 | 5/1968 | Dwyer | 317/18 R |

Primary Examiner—William M. Shoop, Jr.
Assistant Examiner—Harvey Fendelman
Attorney—Dunlap, Laney, Hessin & Dougherty

[57] ABSTRACT

Apparatus for connection in series with power equipment and a grounded AC power source which enables sensing of ground lead leakage current and excess power consumption to open the power application circuit and avoid damaging conditions and effects to the power equipment and/or operator. The apparatus consists of a momentary pushbutton switch and holding relay connected in series with the AC powerline to enable application of electric power to the power equipment. Both an excess power-sensing circuit and a ground current leakage-sensing circuit provide input to a normally nonconductive reactance stage which, in the event of sense input, is biased to the conductive state thereby to effect deenergization of the holding relay to release the pushbutton switch contacts.

7 Claims, 2 Drawing Figures

Patented March 7, 1972

3,648,111

INVENTOR
GUY E. HOWE

BY
Dunlap, Laney, Hessin & Dougherty
ATTORNEYS 3,648,111

DEVICE FOR SENSING OVERCURRENT AND GROUND LEAKAGE CURRENT

BACKGROUND OF THE INVENTION

1. Field of the Invention

The invention relates generally to electrical safety equipment and, more particularly, but not by way of limitation, it relates to overcurrent and ground fault protection circuitry for use with AC power equipment.

2. Description of the Prior Art

The prior art includes numerous types of overload device for providing protection of such as AC energized power tools. One general form of protective device utilizes balanced circuit means for ground-absence detection to provide sensing for a proper ground at the supply socket and, if circuit unbalance or improper ground is indicated, the apparatus provides a warning signal which then prevents transmission of power to the output load device. Thus, such an instrument insures that the supply socket is properly grounded for allowing energization. Still other varied forms of device serve to sense contact of a hand tool to a ground object, viz, water pipes, gas pipes, electrical wiring conduits, etc., which may be enclosed within the particular work surface. A pertinent form of such prior art is U.S. Pat. No 3,386,004 in the name of Dwyer which utilizes a fixed voltage circuit between the ground connection of the particular power tool and the AC powerline supplying the tool. This teaching utilizes sensing of an overvoltage condition through utilization of a zener diode combination to control an actuating relay which maintains the various AC circuit connection until deactuated.

SUMMARY OF THE INVENTION

The present invention contemplates an improved ground detection and overcurrent protective circuit for use with AC instruments, tools and the like. In a more limited aspect, the invention consists of pushbutton activated switch means and parallel holding relay means connected in circuit with a grounded AC supply line, and additional circuit means for deenergizing said holding relay means upon sensing of certain alarm conditions relative to the supply circuitry. Thus, conductance means connected in series with the AC power leads provides an output on conditions of excessive current, which overcurrent output is applied through reactance circuitry to deactivate said holding relay means. In addition, a second sense input circuitry detects very minimal leakage current in the ground circuit also to provide sensing input to said reactance means thereby to deactivate said holding relay means and open the AC supply line.

Therefore, it is an object of the present invention to provide an automatic protection circuit for AC power applications which is faster in response of deenergization as well as more sensitive to minimal variations from the normal power characteristics.

It is also an object of the invention to provide such a protective device which is responsive not only to overcurrent conditions but also to current leakage conditions in the ground lead of the AC connection.

It is still further an object of the invention to provide an automatic deenergizing device for use with such as electrical drill equipment to effect immediate deenergization upon contact of the drill bit with any hidden metal objects which may be disposed within a work panel or the like in grounded or energized condition while keeping the tool effectively grounded.

Finally, it is an object of the present invention to provide an automatic stop circuit for use with such as a power drill which is sensitive to contact with the grounded object as well as to conditions causing the power drill to draw excessive current.

Other objects and advantages of the invention will be evident from the following detailed description when read in conjunction with the accompanying drawing which illustrates the invention.

DETAILED DESCRIPTION OF THE INVENTION

Figure 1:
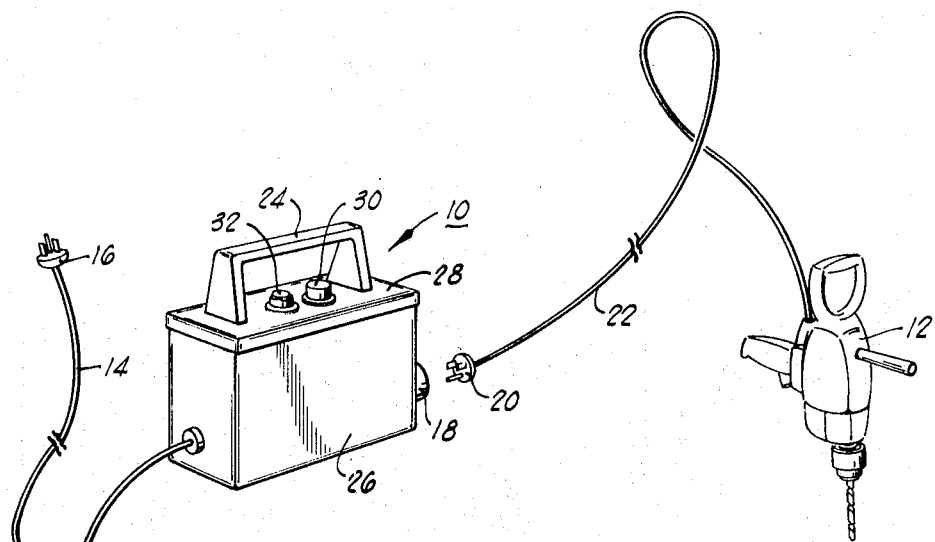
FIG. 1 is a pictorial representation of the protective device of the invention as employed with a power drill unit.

As shown in FIG. 1, a protective device 10 constructed in accordance with the teachings of the invention is utilized in series with the alternating current electrical input to such as a power drill 12. Thus, protective device 10 is connected by means of a standard grounded AC power line 14 and three-prong plug 16 to a suitable source of AC power. Output from the protective device 10 is provided via a receptacle 18 of the three-prong variety which receives a mating plug 20 as attached to power cord 22 of electric drill 12.

The protective device 10 may be formed in any of various functional and appealing design; however, the unit as presently constructed includes a handle 24 extending along the long dimension of a generally rectangular compartment 26 having an upper panel 28 suitably fastened thereon in generally sealed relationship. Two control actuators are accessible through such as rubberized protective caps, and these are a TEST pushbutton 30 and a SET pushbutton 32 as disposed immediately below handle 24 to enable more facile one-hand controlling.

Figure 2:
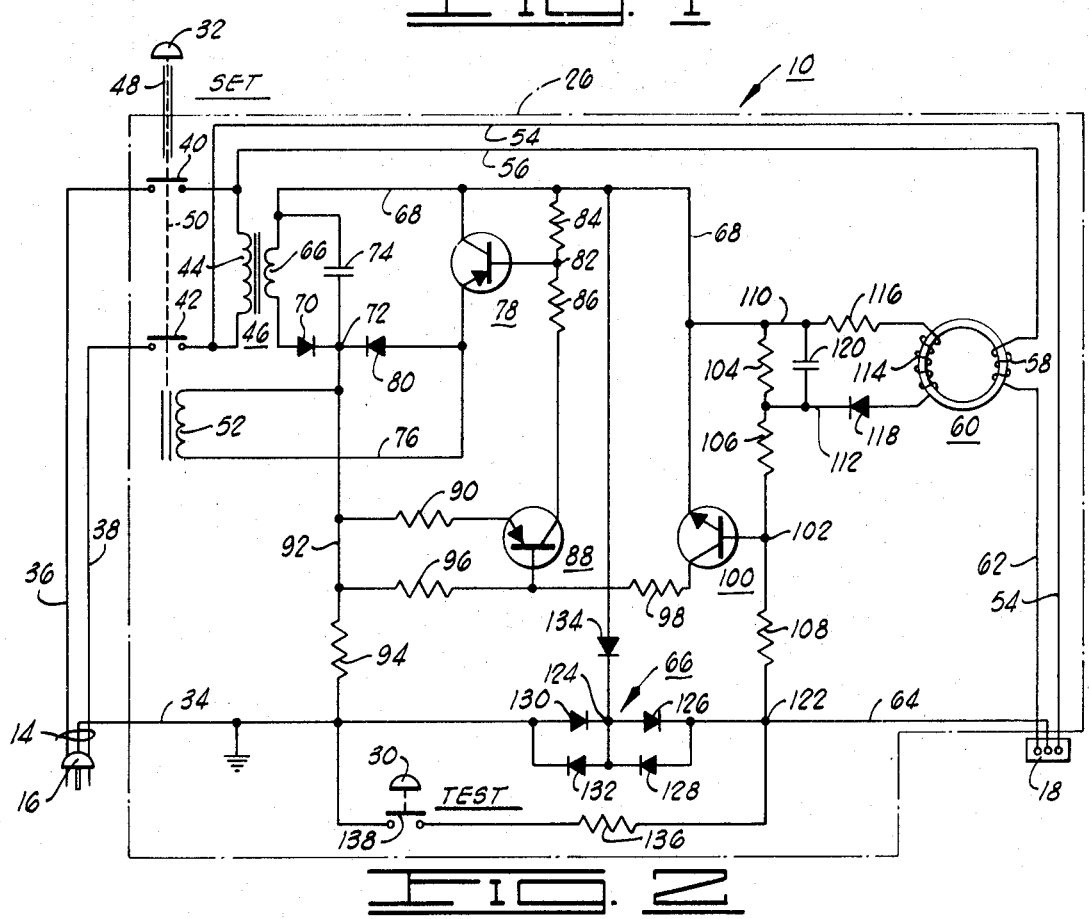
FIG. 2 is a schematic diagram of the protective device of FIG. 1.

Referring now to FIG. 2, the particular device 10 is shown in schematic diagram, such circuitry being enclosed within the compartment 26. AC input via power line 14 is connected to a ground lead 34 as well as to a pair of AC voltage input leads 36 and 38 through respective SET switch contacts 40 and 42 to a primary winding 44 of a stepdown transformer 46, as will be further described below. The SET pushbutton 32 is connected via an insulative rod 48, in suitable linkage shown by dashline 50, to each switch contacts 40 and 42 such that they are manually closed upon momentary depression of SET pushbutton 32. In similar manner, the intercontact linkage 50 is also operable in response to energization of a holding relay coil 52 to close switch contacts 40 and 42.

AC input voltage as applied across primary winding 44 is also conducted in parallel via leads 54 and 56 to provide AC energization of the implement or, in this case, the power drill 12. Thus, AC lead 54 is applied directly to power receptacle 18, and AC lead 56 is applied through a winding 58 of a toroidal transformer 60 with output via lead 62 to a second contact of power receptacle 18. A ground connection to power receptacle 18 is provided via a ground test lead 64 in series with a diode network 66, to be further described below.

The power transformer 46 is a stepdown variety having a turns ratio of approximately 20 to 1 such that a much reduced voltage on the order of 6 volts AC is induced across a secondary winding 66 as connected between a lead 68 and a rectifier 70 having the negative pole connected to a junction point 72. A capacitor 74 is connected across the series combination of winding 66 and rectifier 70, and further connection is made from junction point 72 through relay winding 52 with return via lead 76 to the emitter of PNP type transistor 78. A further rectifier 80 is connected between the emitter lead 76 and junction point 72 in opposite polarity to rectifier 70 such that a minimum DC voltage is maintained between junction point 72 and lead 68. Such minimum voltage protects against false activation of transistor 78.

The transistor 78 has the collector connected to negative DC voltage as supplied on lead 68, while the base is connected to a junction point 82 as established by interconnection of resistances 84 and 86. The resistors 84 and 86 are connected in series between supply lead 68 and the collector of a PNP-type transistor 88. The emitter of transistor 88 is connected through a resistor 90 to a lead 92 (which is common with junction point 72) and is then returned to ground lead 34 through a resistor 92. The base of transistor 88 is similarly connected through a series interconnection to resistor 96, lead 92, and resistor 94.

The base of transistor 88 is also connected through a resistor 98 to the collector of an NPN-type transistor 100 which has the emitter connected directly to voltage supply lead 68. The base is connected to a junction point 102 which is established at the interconnection between series connected resistors 104 and 106 and a third resistor 108 connected to ground test lead 64. A pair of leads 110 and 112 are connected across resistor 104 to provide energization of a winding 114 of toroidal transformer 70. A resistor 116 is connected in series with lead 110 while a rectifier 118 is connected in series with opposite lead 112. A capacitor 120, of relatively large capacitance, is connected across resistor 104 to the negative pole of rectifier 118 to provide a smoothing function relative to sensed output voltage on lead 112 to junction point 102.

The resistor 108 in the base circuit of transistor 100 is connected to ground test lead 64 at a junction point 122. Also connected between junction point 122 and ground lead 34 is the diode network 66 which includes a central junction point 124 and a first pair of oppositely polarized, parallel diodes 126 and 128 connected between junction point 124 and 122, and having a second pair of oppositely polarized, parallel diodes 130 and 132 connected between junction point 124 and ground lead 34. Still another diode 134 is connected from negative voltage supply lead 68 with the negative pole connected to the junction point 124 thereby to provide biasing stability relative to transistor 100.

A test circuit consisting of a resistor 136 and momentary pushbutton contacts 138, as activated by TEST pushbutton 30, is connected in parallel with diode network 66 between terminal point 122 and ground lead 34.

The various circuit parameters and physical values of components are critical in several instances, such critical components actually serving to contribute to the overall function of the circuit. Thus, the NPN-type transistor 100 should be one which exhibits a relatively low current flow in its quiescent condition. For example, this may be a NPN germanium-type transistor having about 0.2 voltage drop; but, such transistors are relatively expensive, and it has been found that an NPN silicon-type transistor having a voltage drop of about 0.6 volts can be used to good advantage when all other circuit parameters are balanced in account. Also, in the diode network 66, each of the diodes 126 through 132 should be a silicon diode having a desirable characteristic with regard to the inherent voltage hill of 0.6 volts per diode. The series configuration in each direction (polarity) of diodes 126-132 enable an accurate biasing characteristic relative to the base of transistor 100, the overall effect being one of desirable contribution to the circuit function. Still further, it is a characteristic of such silicon diodes that destruction of a diode by overcurrent in unexpected situations will result in permanent shorting of the diode rather than an open circuit condition. This serves to safeguard by insuring that the protective device 10 actuates to cut off AC voltage application therethrough.

OPERATION

The protective device 10 may be interposed between the electrical outlet from an installation electrical system and a power implement or such as power drill 12 which is to be utilized in or about the installation. It should always first be ascertained that the installation electrical system is properly grounded in order for protective device 10 to function properly. If there is any doubt as to the system ground, then a suitable ground connection should be made between protective device 10 and the surrounds.

The protective device 10 finds particular application with respect to usage of power drill 12 since such an implement is quite often used in a blind situation where the operator does not know what hazardous circuits or conduits may be disposed within a wall or panel area. Thus, the protective device 10 is designed to detect a current leakage of very minute proportions in the ground test lead, which leakage current is sufficient to actuate the protective device 10 to disable application of the AC energizing voltage through receptacle 18. Also, the protective device 10 includes a second sensing capability which detects an overcurrent situation as drawn by the power implement through AC leads 54 and 56, which detection is also applied to disable the application of AC voltage through protective device 10.

Protective device 10 is started by depressing the SET pushbutton 32 to close switch contacts 40 and 42 such that AC energizing voltage is present on leads 54 and 56. The application of AC voltage is also applied through stepdown transformer 46 for application to half-wave rectifier constituted by rectifiers 70 and 80 such that −6 volts DC is placed on voltage supply lead 68 thereby to energize transistor 78 to a conductive state which serves to energize holding relay 52 and to hold the momentarily closed switch contacts 40 and 42 in their closed position. At this time transistor 88 is cut off and the voltage terminal point 82 is a high negative voltage approaching the supply voltage on lead 68 to maintain conduction through PNP transistor 78.

If desired, circuit tests can be effected by depression of TEST pushbutton 30 to close switch contact 138 and to provide a low resistance connection between ground lead 34 and ground test lead 64 at junction point 122. An 80 microamp current flow is sufficient to cause test activation. At this occurrence, an increasing negative voltage is present at junction point 122 and, therefore, at junction point 102 at the base of transistor 100, thereby to cause transistor 100 to conduct. The conduction of transistor 100 then causes an increase in negative potential at the base of transistor 88 such that it too is placed in conduction. The conduction of transistor 88 with current flow through resistors 86 and 84 causes a decrease in negative potential, or a more positive voltage, to appear at junction point 82 thereby to cut off transistor 78 and to crease current flow through holding relay 52 which releases AC supply lead contacts 40 and 42.

After successful indication in response to the TEST actuation of pushbutton 30, the protective device 10 may be reset by depression of the SET pushbutton 32 to once again apply AC voltage through input transformer 46 and the AC conductive leads 54 and 56 to output receptacle 18. The power drill 12 or such implement is then energized and ready for use, and a reasonable amount of current can be drawn through output leads 54 and 62, i.e., on the order of 10 to 15 amperes depending upon initial calibration, without actuation of the overcurrent protective circuit consisting of toroidal transformer 60 and rectifier 118. In the event that, for some reason, the power implement or power drill 12 does draw an excessive amount of current, the rectified output from transformer 60 through rectifier 118 will result in greater than a predetermined amount of current flow through resistor 106 such that the potential at junction point 102 exceeds a preset negative value to cause the NPN-type transistor 100 to go to conduction. Thus, as previously described, conduction of transistor 100 causes conduction of transistor 88 which, in turn, causes cutoff of transistor 78 to release the holding relay 52 thereby to remove the AC supply. The PNP-transistor 88 is only actuated to conduction for one one-hundred twentieths of a second after which all power is removed and conduction ceases.

Protective device 10 also includes the capability of sensing leakage current in the ground test lead 64, which leakage current even through minimal is capable of disabling the protective device 10. Thus, in using such as power drill 12 the operator may position the drill such that the bit comes into contact with a gas pipe or other conductive conduit having a differing ground potential whereupon a leakage current will be present on lead 64. This leakage current will be reflected at junction point 122 as a negative voltage to bias junction point 102 such that, upon sensing of 20 microamperes or greater, the transistor 100 goes into conduction to initiate the disabling function. That is, conduction of transistor 100 causes conduction of transistor 88 for the next occuring half-cycle of the AC input which then cuts off transistor 78 to disable holding relay 52. The biasing of transistor 100 from junction point 122 is accurately maintained through the use of the specifically selected diodes 126–132 in diode network 66. Thus, each of the silicon diodes has a voltage hill of 0.6 volts to develop a bias voltage which is maintained at junction point 122 relative to ground lead 34.

The foregoing discloses a novel protective device for use with power implements which function to sense either an overcurrent condition or a ground leakage current condition, either of which is then capable of removing the AC energization. The device finds particular usage in such as pest control work, and many construction and repair practices wherein it serves as an automatic drill stop for use with a power drill used to bore through blind walls and the like. The circuit parameters are such that no currents can be encountered which are large enough to do bodily harm prior to disabling of AC input through the protective device. Further, the device affords great safety margin due to its extreme sensitivity while maintaining the tool at effective ground.

Changes may be made in the combination and arrangement of elements as heretofore set forth in the specification and shown in the drawings; it being understood that changes may be made in the embodiments disclosed without departing from the spirit and scope of the invention as defined in the following claims.

What is claimed is:

1. Apparatus for automatic control of energization of electrical power-consuming equipment, comprising:
    alternating current conducting means connected between an alternating current power source including a system ground and an alternating current input to said electrical power-consuming equipment, said alternating current input consisting of first and second power leads and a ground lead;
    first sensing means connected in series with said ground lead to provide a first sense output;
    second sensing means connected in series with one of said first and second power leads to provide a second sense output;
    transistor means which is normally nonconducting and receiving input from each of said first and second sense outputs, and to be rendered conductive upon input of predetermined voltage and current values;
    switch means in series with said first and second power means;
    holding relay means connected in parallel to each of first and second power leads and energized upon closure of said switch means to hold said switch means in the closed position; and
    second transistor means which is normally conducting to maintain said holding relay means energized and which is connected to be cut off in response to conduction of said first reactance means to deenergize said holding relay means.

2. Apparatus as set forth in claim 1 wherein said first sensing means comprises:
    rectifier means connected between said system ground and said ground lead, said rectifier means having a predetermined voltage drop thereacross, said first sense output being taken from the junction of said rectifier means and said ground lead.

3. Apparatus as set forth in claim 2 wherein said rectifier means comprises:
    first and second silicon diode rectifiers connected in series and like polarity to exhibit a total voltage drop of 1.2 volts thereacross.

4. Apparatus as set forth in claim 3 which is further characterized to include:
    third and fourth silicon rectifier means connected in series and like but opposite polarity from said first and second rectifier means and in parallel therewith.

5. Apparatus as set forth in claim 1 wherein said transistor means comprises:
    NPN transistor means having its base connected to each of said first and second sense outputs and being nonconducting in absence of one or the other of said sense outputs.

6. Apparatus as set forth in claim 5 which is further characterized to include:
    PNP transistor means having the base connected to the collector of said NPN transistor means, and being biased to be rendered conductive in response to conductivity of said NPN transistor, said conductive output of said NPN transistor being applied to said second transistor means to cut off conduction therein thereby to deenergize said holding means.

7. Apparatus as set forth in claim 1 wherein said second sensing means comprises:
    toroidal transformer means having a primary winding connected in series with one of said first and second power leads, and having a secondary winding providing an AC sense output; and
    rectifier sensing means receiving said AC sensing output to provide a DC output voltage as said second sense output.

* * * * *